(12) United States Patent
Watkins et al.

(10) Patent No.: US 6,618,222 B1
(45) Date of Patent: Sep. 9, 2003

(54) DISK DRIVE HAVING BREATHER SHROUD

(75) Inventors: Norman K. Watkins, Morgan Hills, CA (US); Wayne M. Yamada, San Jose, CA (US); Frederick J. Hanke, Newark, CA (US); Gary Griffin, Boulder Creek, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/887,748

(22) Filed: Jun. 21, 2001

(51) Int. Cl.[7] .............................................. G11B 33/14
(52) U.S. Cl. .................................................. 360/97.02
(58) Field of Search ........................... 360/97.01–97.04

(56) References Cited

U.S. PATENT DOCUMENTS

| | | | | |
|---|---|---|---|---|
| 4,280,155 A | * | 7/1981 | Scott et al. ..................... 360/98 |
| 4,660,110 A | * | 4/1987 | Iida et al. ...................... 360/98 |
| 4,888,655 A | * | 12/1989 | Bonn ...................... 360/97.03 |
| 4,967,295 A | * | 10/1990 | Yamauchi et al. ........ 360/97.02 |
| 5,138,506 A | * | 8/1992 | Beck et al. .............. 360/97.02 |
| 5,406,431 A | * | 4/1995 | Beecroft .................. 360/97.02 |
| 5,447,695 A | * | 9/1995 | Brown et al. ............ 360/97.02 |
| 5,517,372 A | * | 5/1996 | Shibuya et al. .......... 360/97.02 |
| 5,854,725 A |   | 12/1998 | Lee |
| 5,898,545 A |   | 4/1999 | Schirle |
| 6,008,965 A | * | 12/1999 | Izumi et al. ............. 360/97.03 |
| 6,144,522 A | * | 11/2000 | Myokan et al. .......... 360/97.02 |
| 6,214,070 B1 | * | 4/2001 | Crowder et al. ......... 360/97.02 |
| 6,266,208 B1 | * | 7/2001 | Voights ................... 360/97.02 |
| 6,296,691 B1 | * | 10/2001 | Gidumal .................. 360/97.02 |
| 6,496,327 B2 | * | 12/2002 | Xia et al. ................. 360/97.03 |

* cited by examiner

*Primary Examiner*—Allen Cao
(74) *Attorney, Agent, or Firm*—Won Tae C. Kim, Esq.; Milad G. Shara, Esq.; Stetina Brunda Garred & Brucker

(57) ABSTRACT

A disk drive includes at least one rotatable disk including a disk edge and a disk drive housing having a breather hole formed through the disk drive housing. The disk drive further includes a breather shroud in mechanical communication with the disk drive housing. The breather shroud includes a shroud portion positioned adjacent the disk. The shroud portion is formed to extend along the disk edge for mitigating airflow adjacent the disk. The breather shroud further includes an air filter housing portion integrated with the shroud portion. The air filter housing portion is disposed adjacent the breather hole for filtering airflow through the breather hole. The air filter housing portion is positioned with the shroud portion between the air filter housing portion and the disk edge for mitigating airflow from the breather hole to adjacent to the disk.

22 Claims, 3 Drawing Sheets

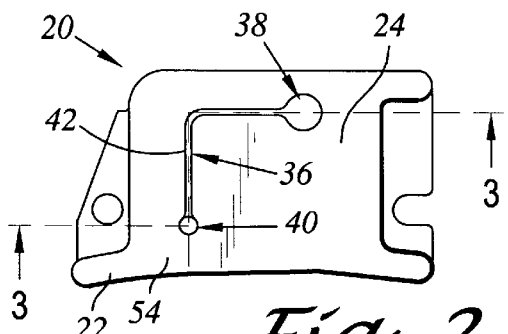
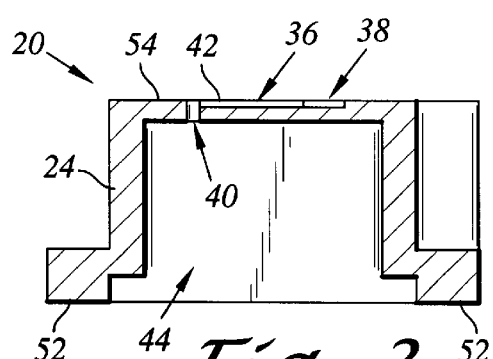
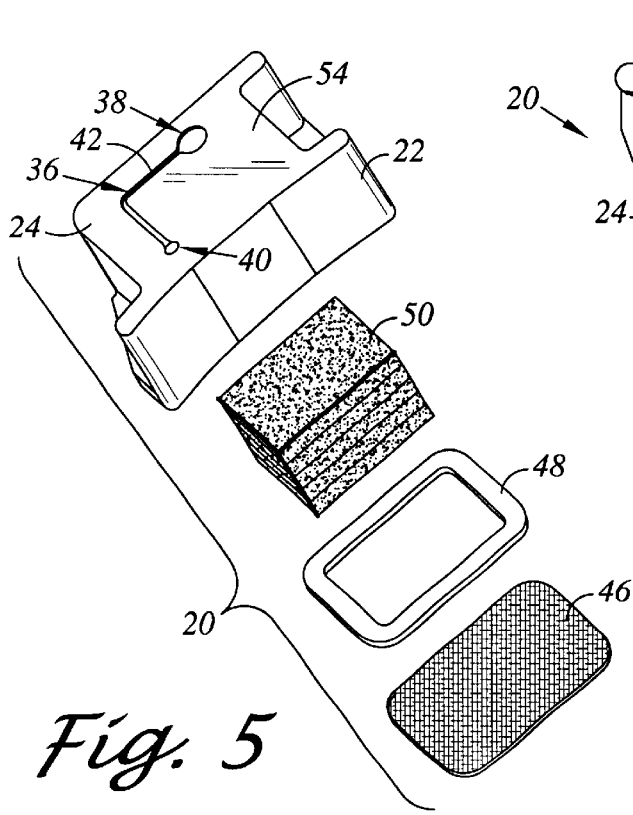

DISK DRIVE HAVING BREATHER SHROUD

CROSS-REFERENCE TO RELATED APPLICATIONS

Not applicable.

BACKGROUND OF THE INVENTION

1. Field of the Invention

The present invention relates generally to disk drives, and more particularly to a disk drive having a breather shroud.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA) having an actuator assembly having at least one transducer head, typically several, for reading and writing data from the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

A topic of concern is the desire to reduce the effects of airflow generated within the disk drive due to rotation of the disks. Of particular concern is the occurrence of airflow which may tend to excite a resonance response of the actuator assembly. This results in an increase in the percent off track values of the associated head. Further, such disk rotation induced airflow may result in a force applied to the actuator assembly, i.e., windage. Further, such disk rotation induced airflow may result in vibration of the disk or disk flutter. It is contemplated that the disk rotation induced airflow tends to become turbulent radially beyond the outer disk edges due to boundary layer separation occurring within various cavities within the disk drive. Such turbulent airflow further tends to impact the resonance response of the actuator assembly and disk flutter. Another topic of concern is the regulation of airflow between the internal and external environments of the disk drive. In this regard, it is desirable to filter airflow entering the disk drive for undesirable particulates and chemical compounds. Moreover, regulation of humidity within the disk drive is of concern. The foregoing functions of shrouding and filtering have been accomplished via various separate and discrete subcomponents which must be all manufactured and assembled into the disk drive. Such manufacture and assembly of the subcomponents into the disk drive increase the costs of disk drives. Accordingly, there is a need in the art for an improved disk drive for mitigation of such disk rotation induced airflow and for filtering airflow entering the disk drive at a lower cost in comparison to the prior art.

SUMMARY OF THE INVENTION

An aspect of the invention can be regarded as a disk drive which includes at least one rotatable disk including a disk edge and a disk drive housing having a breather hole formed through the disk drive housing. The disk drive further includes a breather shroud in mechanical communication with the disk drive housing. The breather shroud includes a shroud portion positioned adjacent the disk. The shroud portion is formed to extend along the disk edge for mitigating airflow adjacent the disk. The breather shroud further includes an air filter housing portion integrated with the shroud portion. The air filter housing portion is disposed adjacent the breather hole for filtering airflow through the breather hole. The air filter housing portion is positioned with the shroud portion between the air filter housing portion and the disk edge for mitigating airflow from the breather hole to adjacent to the disk.

According to an embodiment of the present invention, the air filter housing portion includes an elongate passageway having a passageway inlet extending to a passageway outlet. The passageway inlet is disposed in fluid communication with the breather hole. The shroud portion is disposed between the passageway outlet and the disk edge for mitigating airflow from the breather hole to adjacent to the disk. Further, the air filter housing portion includes a channel formed in the air filter housing portion. The passageway is formed between the channel and the disk drive housing. The air filter housing portion includes an inner cavity, and the passageway outlet extends to the inner cavity. The air filter housing portion includes a particulate filter extending across the inner cavity for filtering particulates from airflow through the breather hole. The air filter housing portion includes a chemical compound filter disposed within the inner cavity for removing chemical compounds from airflow through the breather hole. The chemical compound filter may be a chemical trap and an adsorbent. The disk drive housing includes a disk drive cover, and the breather hole is disposed through the disk drive cover. The breather shroud may be attached to the disk drive cover. The disk drive housing may further include a disk drive base, and the breather shroud may be disposed in compression between the disk drive cover and the disk drive base. Further, the breather shroud may be formed of an electrostatic dissipative material. The breather shroud may be formed of a conductive material.

According to another aspect of the present invention, there is provided a breather shroud for use in a disk drive as described above.

BRIEF DESCRIPTION OF THE DRAWINGS

FIG. 2 is a top view of a breather shroud having an air filter housing portion and a shroud portion;

FIG. 3 is a cross-sectional view of the breather shroud of FIG. 2 as seen along axis 3—3;

FIG. 4 is a bottom view of the breather shroud of FIG. 2;

FIG. 5 is an exploded perspective view of the breather shroud of FIGS. 2–4 as additionally shown with a chemical compound filter and a particulate filter;

DESCRIPTION OF THE PREFERRED EMBODIMENTS

Figure 1:
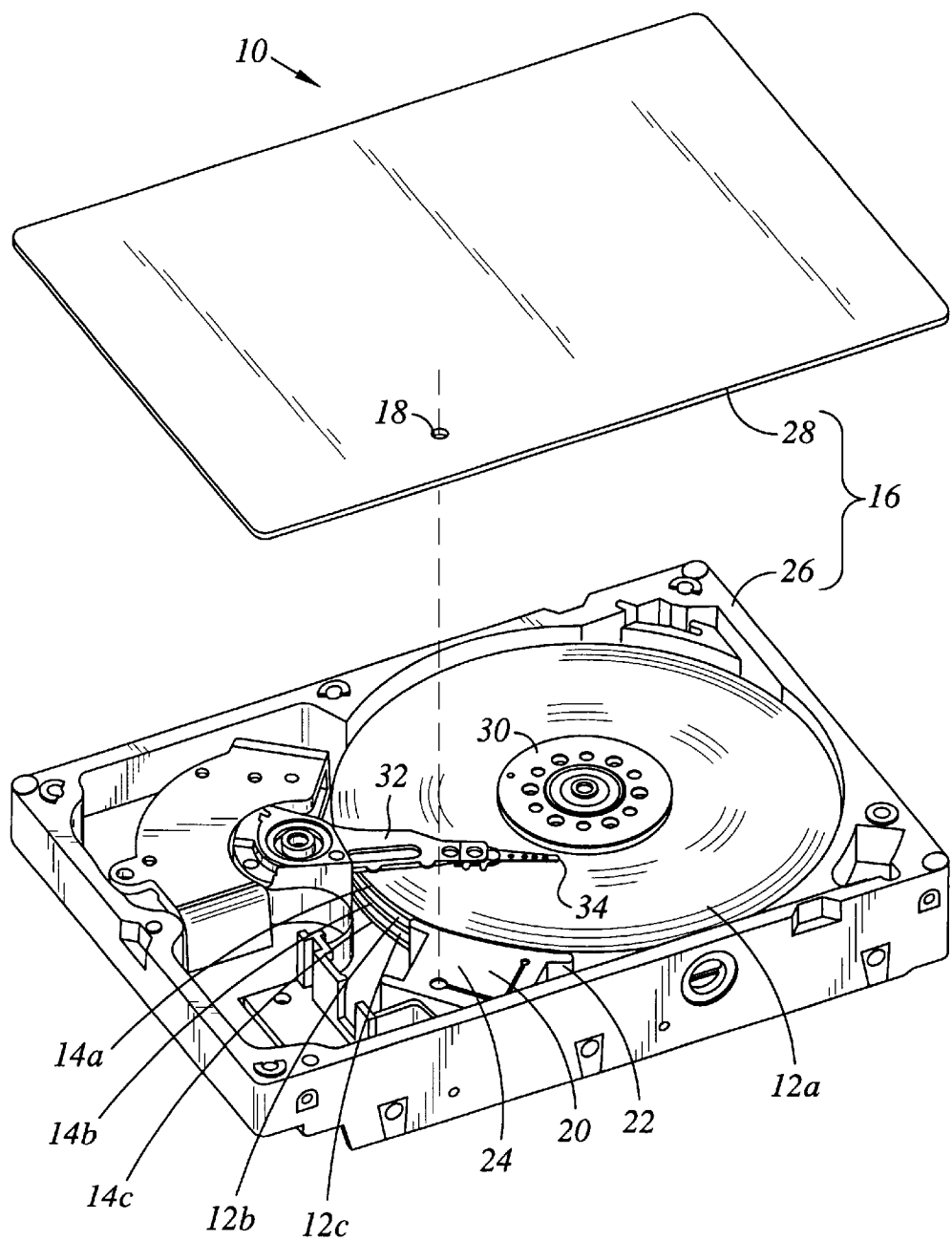
FIG. 1 is a perspective view of a disk drive including a breather shroud as constructed in accordance with an aspect of the present invention.

Referring now to the drawings wherein the showings are for purposes of illustrating preferred embodiments of the present invention only, and not for purposes of limiting the same, FIGS. 1–5 and 6a–b illustrate a disk drive and a breather shroud in accordance with aspects of the present invention.

Referring now to FIG. 1, there is depicted a disk drive 10 constructed in accordance with an aspect of the present invention. The disk drive 10 includes at least one rotatable disk 12 (individually denoted 12a–c). The disks 12a–c respectively include disk edges 14a–c. The disk drive 10 further includes a disk drive housing 16 having a breather hole 18 formed through the disk drive housing 16. The disk drive 10 further includes a breather shroud 20 in mechanical communication with the disk drive housing 16. The breather shroud 20 includes a shroud portion 22 positioned adjacent the disks 14a–c. The shroud portion 22 is formed to extend along the disk edges 14a–c for mitigating airflow adjacent the disks 12a–c. The breather shroud 20 further includes an air filter housing portion 24 integrated with the shroud portion 22. The air filter housing portion 24 is disposed adjacent the breather hole 18 for filtering airflow through the breather hole 18. The air filter housing portion 24 is positioned with the shroud portion 22 between the air filter housing portion 24 and the disk edges 14a–c for mitigating airflow from the breather hole 18 to adjacent to the disks 12a–c.

In further detail according to an embodiment of the present invention, the disk drive housing 16 includes a disk drive base 26 and a disk drive cover 28 which cooperatively house the remainder of the components of the disk drive 10. The breather hole 18 is preferably disposed through the disk drive cover 28. The disk drive 10 includes a spindle motor hub (not shown) rotatably attached to the disk drive base 26. The disks 12a–c are stack mounted upon the hub, and a disk clamp 30 is used to secure the disks 14a–c to the hub. The disk drive 10 further includes a head stack assembly 32 rotatably attached to the disk drive base 26 in operable communication with the disks 12a–c. The head stack assembly 32 includes a transducer heads 34 (only one shown). In this regard, the head stack assembly 32 is configured to rotate relative to the disk 12a–c for reading and writing data therewith.

As mentioned above, the breather shroud 20 includes the shroud portion 22 positioned adjacent the disks 14a–c and is formed to extend along the disk edges 12a–c for mitigating airflow adjacent the disks 12a–c. In the absence of such shroud portion 22, upon disk rotation, turbulent airflow may tend to develop beyond the disk edges 14a–c due to boundary layer separation occurring in internal cavities of the disk drive base 26. In this regard, such development of turbulent airflow may be mitigated thereby shielding the disks 14a–c and the head stack assembly 32 from airflow effects thereon.

According to an embodiment of the present invention, referring now additionally to FIGS. 2–4, the air filter housing portion 24 includes an elongate passageway 36 having a passageway inlet 38 extending to a passageway outlet 40. The passageway inlet 38 is disposed in fluid communication with the breather hole 18. The passageway 36 may be configured as a diffusion path, for regulating humidity and temperature within the disk drive 10, as well as a labyrinth path for removing particulates from airflow through the breather hole 18. The shroud portion 22 is disposed between the passageway outlet 40 and the disk edges 14a–c for mitigating airflow from the breather hole 18 to adjacent to the disks 12a–c. Further, the air filter housing portion 24 includes a channel 42 formed in the air filter housing portion 24. The passageway 36 is formed between the channel 42 and the disk drive housing 16, preferably the disk drive cover 28 of the disk drive housing 16. The air filter housing portion 24 includes an inner cavity 44, and the passageway outlet 40 extends to the inner cavity 44.

Figure 6A:
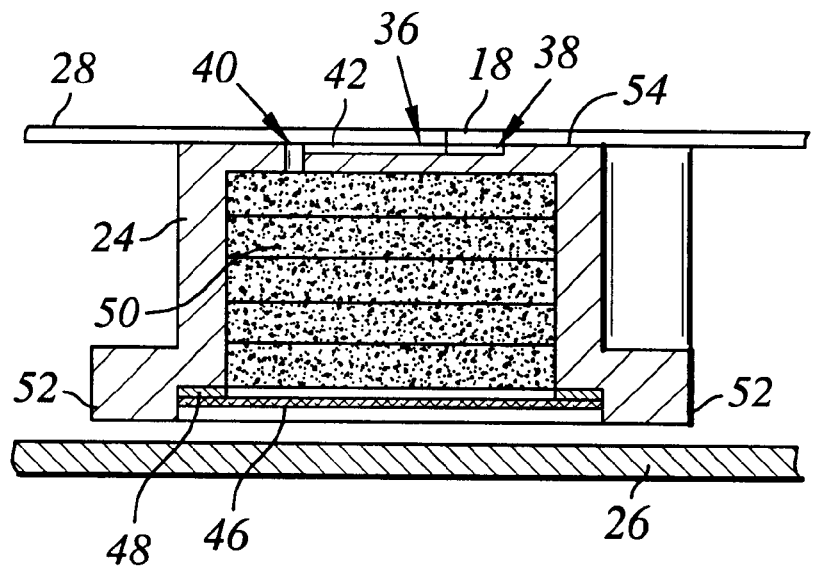
FIG. 6a is a cross-sectional view similar to the view of FIG. 3 of the breather shroud of FIG. 5 shown as installed in the disk drive with portions of a disk drive cover and base shown.
Figure 6B:
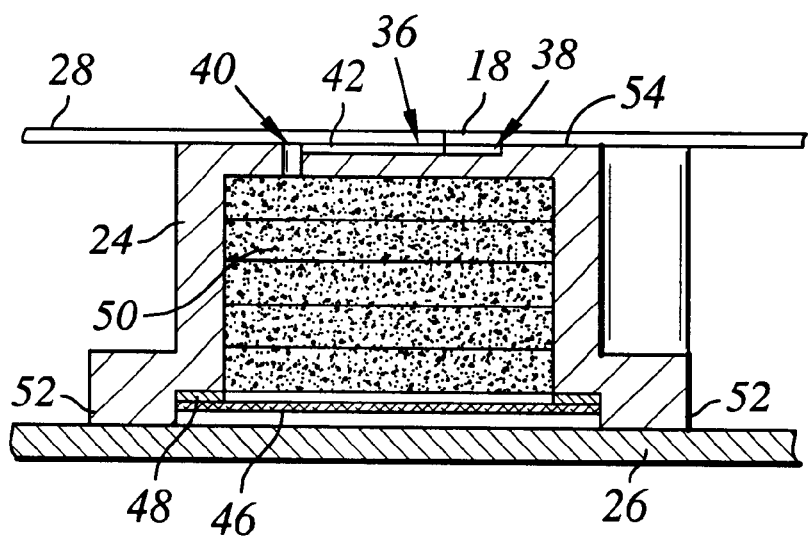
FIG. 6b is a cross-sectional view similar to the view of FIG. 6a, however, with the breather shroud in compression between the disk drive cover and the disk drive base.

Referring additionally now to FIGS. 5 and 6a–b, the air filter housing portion 24 may further include a particulate filter 46 extending across the inner cavity 44 for filtering particulates from airflow through the breather hole 18. An adhesive gasket 48 may be provided for attaching the particulate filter 46 to the air filter housing portion 24. The air filter housing portion 24 includes a chemical compound filter 48 disposed within the inner cavity 44 for removing chemical compounds from airflow through the breather hole 18. The chemical compound filter 48 may be a chemical trap, such as potassium carbonate or sacrificial metals, such as copper or silver. Further, the chemical compound filter 48 may be an adsorbent. The adsorbent may be a desiccant such as silica gel, clay or carbon. Further, usage of carbon is contemplated to advantageously remove organics.

It is contemplated that the breather shroud 20 may be attached to the disk drive housing 16 through the use of an adhesive. In this regard, an adhesive may be applied about a top surface 54 of the breather shroud which is disposed in mechanical communication with the disk drive cover 26 such as shown in FIG. 6a. Alternatively, referring now to FIG. 6b, the breather shroud 20 may be held in place by being disposed in compression between the disk drive cover 28 and the disk drive base 26. In this regard, the breather shroud 20 may be provided with housing feet 52. The top surface 54 may be disposed against the disk drive cover 28 and the housing feet may be seated against the disk drive base 26.

Further, the breather shroud 20 may be formed of an electrostatic dissipative material. The breather shroud may be formed of a conductive material. As the breather shroud 20 may extend between the disk drive cover 28 and the disk drive base 26, the breather shroud 20 may include a metallic plating or coating for forming an electrical pathway to ground.

We claim:

1. A disk drive comprising:
   at least one rotatable disk including a disk edge;
   a disk drive housing having a breather hole formed through the disk drive housing; and
   a breather shroud in mechanical communication with the disk drive housing comprising:
   a shroud portion positioned adjacent the disk, the shroud portion being formed to extend along the disk edge for mitigating airflow adjacent the disk; and
   an air filter housing portion integrated with the shroud portion, the air filter housing portion being disposed adjacent the breather hole for filtering airflow through the breather hole, the air filter housing portion being positioned with the shroud portion between the air filter housing portion and the disk edge for mitigating airflow from the breather hole to adjacent to the disk, the air filter housing portion including an elongate passageway having a passageway inlet extending to a passageway outlet, the passageway inlet being disposed in fluid communication with the breather hole.

2. The disk drive of claim 1 wherein the shroud portion is disposed between the passageway outlet and the disk edge for mitigating airflow from the breather hole to adjacent to the disk.

3. The disk drive of claim 1 wherein the air filter housing portion includes a channel formed in the air filter housing portion, the passageway is formed between the channel and the disk drive housing.

4. The disk drive of claim 1 wherein the air filter housing portion includes an inner cavity, the passageway outlet extends to the inner cavity.

5. The disk drive of claim 4 wherein the air filter housing portion includes a particulate filter extending across the inner cavity for filtering particulates from airflow through the breather hole.

6. The disk drive of claim 4 wherein the air filter housing portion includes a chemical compound filter disposed within the inner cavity for removing chemical compounds from airflow through the breather hole.

7. The disk drive of claim 6 wherein the chemical compound filter is a chemical trap.

8. The disk drive of claim 6 wherein the chemical compound filter is an adsorbent.

9. The disk drive of claim 1 wherein the disk drive housing includes a disk drive cover, the breather hole is disposed through the disk drive cover.

10. The disk drive of claim 9 wherein the breather shroud is attached to disk drive cover.

11. The disk drive of claim 1 wherein the disk drive housing includes a disk drive cover and a disk drive base, the breather shroud is disposed in compression between the disk drive cover and the disk drive base.

12. The disk drive of claim 1 wherein the breather shroud is formed of an electrostatic dissipative material.

13. The disk drive of claim 1 wherein the breather shroud is formed of a conductive material.

14. A breather shroud for use in a disk drive, the disk drive including at least one rotatable disk including a disk edge and a disk drive housing having a breather hole formed through the disk drive housing, the breather shroud comprising:

a shroud portion positionable adjacent the disk, the shroud portion being formed to extend along the disk edge for mitigating airflow adjacent the disk; and an air filter housing portion integrated with the shroud portion, the air filter housing portion being disposable adjacent the breather hole for filtering airflow through the breather hole, the air filter housing portion being positionable with the shroud portion between the air filter housing portion and the disk edge for mitigating airflow from the breather hole to adjacent to the disk, the air filter housing portion including an elongate passageway having a passageway inlet extending to a passageway outlet, the passageway inlet being disposed in fluid communication with the breather hole.

15. The breather shroud of claim 14 wherein the air filter housing portion includes a channel formed in the air filter housing portion, the passageway is formable between the channel and the disk drive housing.

16. The breather shroud of claim 14 wherein the air filter housing portion includes an inner cavity, the passageway outlet extends to the inner cavity.

17. The breather shroud of claim 14 wherein the air filter housing portion includes a particulate filter extending across the inner cavity for filtering particulates from airflow through the breather hole.

18. The breather shroud of claim 17 wherein the air filter housing portion includes a chemical compound filter disposed within the inner cavity for removing chemical compounds from airflow through the breather hole.

19. The breather shroud of claim 18 wherein the chemical compound filter is a chemical trap.

20. The breather shroud of claim 18 wherein the chemical compound filter is an adsorbent.

21. The breather shroud of claim 14 wherein the breather shroud is formed of an electrostatic dissipative material.

22. The breather shroud of claim 14 wherein the breather shroud is formed of a conductive material.

\* \* \* \* \*